(12) United States Patent
Kawada

(10) Patent No.: US 6,578,284 B2
(45) Date of Patent: Jun. 17, 2003

(54) UNIT TYPE LINEAR SCALE

(75) Inventor: Hiroaki Kawada, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/939,835

(22) Filed: Aug. 28, 2001

(65) Prior Publication Data

US 2002/0026725 A1 Mar. 7, 2002

(30) Foreign Application Priority Data

Sep. 6, 2000 (JP) ........................................ 2000-269766

(51) Int. Cl.$^7$ ................................................ G01B 3/00
(52) U.S. Cl. .......................................... 33/706; 33/707
(58) Field of Search ........................... 33/702, 703, 704, 33/705, 706, 701, 708

(56) References Cited

U.S. PATENT DOCUMENTS

| | | | | |
|---|---|---|---|---|
| 4,170,826 A | * | 10/1979 | Holstein | 33/702 |
| 4,569,137 A | * | 2/1986 | Ichikawa | 33/706 |
| 4,777,728 A | * | 10/1988 | Ludicke | 33/702 |
| 5,016,359 A | * | 5/1991 | Nagaoka et al. | 33/702 |
| 5,115,573 A | * | 5/1992 | Rieder et al. | 33/706 |
| 5,279,043 A | * | 1/1994 | Rieder et al. | 33/702 |

FOREIGN PATENT DOCUMENTS

| | | | | |
|---|---|---|---|---|
| DE | 3623217 | * | 4/1987 | 33/706 |
| DE | 3402613 | * | 1/1991 | 33/705 |
| JP | 361095202 A | * | 5/1986 | 33/703 |

* cited by examiner

Primary Examiner—Diego Gutierrez
Assistant Examiner—Travis Reis
(74) Attorney, Agent, or Firm—Oliff & Berridge, PLC

(57) ABSTRACT

A unit type linear scale is provided, which has a frame body that houses a plate-shaped main scale and extends in a direction of length measurement. The frame body is fixed with screws at multiple positions to an object of measurement through screw holes formed at a plurality of positions along the direction of length measurement. A groove is formed in the frame and extended in the direction of length measurement, and one surface of the main scale is made to contact with the wall surface of one side of the groove. An elastic component is provided between, however excluding portions where the screw holes are provided, the wall surface of the groove on the other side of the groove along the direction of length measurement and the other surface of the main scale. Thereby, the scale is secured by the frame.

8 Claims, 3 Drawing Sheets

OUTSIDE THE CENTER PORTION

CENTER PORTION

FIG.2B LONG RUBBER PIECE PRESSES THE ENTIRE LENGTH

FIG.2C SHORT RUBBER PIECES ARE PARTLY USED

UNIT TYPE LINEAR SCALE

BACKGROUND OF THE INVENTION

1. Field of the Invention

The present invention relates to a unit type linear scale having a detection head integrally formed with a frame body housing a plate-shaped main scale, wherein the detection head detects the amount of movement in a direction of length measurement based on the amount of relative movement of an index scale that moves along the main scale.

2. Description of the Related Art

A commonly used unit type linear scale is such that a long length of a frame body housing a main scale is fixed to one (object of measurement) of moving bodies that move relatively to each other, a detection head housing an index scale is fixed to the other moving body, and the amount of relative movement of the moving bodies is detected in length measurement by reading the main scale with the detection head. In this unit type linear scale, the detection head is integrally attached to the frame body and movable in a direction of length measurement.

Such a unit type linear scale includes, as means for fixing the frame body in which a main scale is housed on an object (moving body) of measurement, a multi-position fixing method with which the frame body is directly fixed with screws at a plurality of positions along the direction of length measurement.

FIG. 3A is a perspective view showing an aluminum frame (frame body) 10 of this unit type linear scale with the multi-position fixing method fixed to a fixed object (not shown) of measurement, and FIG. 3B shows a side cross sectional view of the aluminum frame.

As shown in the figures, the aluminum frame 10 is formed in a hollow shape extending in the direction of length measurement with an opening 12 at the lower part thereof, and a main scale 14 is secured on the wall surface of one side of a groove 16, formed inside the aluminum frame 10, by being pressed by a round cross section rubber piece (elastic member) 18 provided in the groove 16.

Conventionally, the main scale 14 has been fixed to the aluminum frame 10 in such a way that the entire part of the main scale 14 in the length direction (length measurement direction) is pressed by the round cross section rubber piece 18, and additionally, bonded with a silicon adhesive 20.

In the scale unit 10, a detection portion such as an index scale included in a detection head (not shown) is extended from the opening 12, and the detection portion is movable along the main scale 14 in the direction of length measurement.

A unit type linear scale with the multi-position fixing method as described above is excellent in vibration resistance characteristics, because, as shown in the figure, the frame body is directly fixed to an object of measurement with screws 22 at a plurality of positions (four positions in this case) along the direction of length measurement of the scale unit 10.

However, a problem in a unit type linear scale with the multi-position fixing method is that measurement accuracy is lowered by a wave form of the aluminum frame 10 and main scale 14 in the direction of length measurement caused by tightening force by means of the screws applied when the aluminum frame 10 is fixed. It is also a problem that measurement accuracy is also lowered by the unstable behavior of elongation of the main scale 14 against change in temperature, which occurs because the round cross section rubber piece 18 is used for the entire length of the main scale 14 and aluminum frame 10, and friction force between the main scale 14 and the aluminum frame 10 widely varies owing to varied characteristics of the round cross section rubber piece 18 such as its pressing force and dimensions.

It is an object of the present invention to provide a unit type linear scale with a multi-position fixing method that can improve measurement accuracy without deteriorating the vibration resistance characteristics.

SUMMARY OF THE INVENTION

The present invention is intended to solve the problems described above by providing a unit type linear scale having a frame body that houses a plate-shaped main scale and extends in a direction of length measurement. The frame body is fixed with screws at multiple positions to an object of measurement through screw holes formed at a plurality of positions along the direction of length measurement. In the scale, one surface of the main scale is made to contact with the wall surface of one side of a groove which is formed in the frame and extended in the direction of length measurement. An elastic member is provided between, however excluding portions where the screw holes are provided, the wall surface of the groove on the other side of the groove along the direction of length measurement and the other surface of the main scale, and thereby the scale is secured on the frame.

Namely, in the present invention, it is arranged in such a way that an elastic member for securing the main scale on the frame body is not provided at portions where screw holes are formed and strong tightening force is applied by screws when fixing the frame body to an object of measurement. Measurement accuracy can be improved when compared with a case where an elastic member is provided along the entire length of the main scale, because the transmission of a wave produced in the frame body to the main scale is prevented even when the frame body is screwed to an object of measurement.

Therefore, measurement accuracy is improved in a unit type linear scale without deteriorating vibration resistance characteristics.

BRIEF DESCRIPTION OF THE DRAWINGS

The preferred embodiments will be described with reference to the drawings, wherein like embodiments have been noted throughout the figures with like reference numerals and wherein:

FIGS. 2A, 2B, and 2C are explanatory drawings showing functions and effect of the embodiment.

DETAILED DESCRIPTION OF THE PREFERRED EMBODIMENTS

Preferred embodiments of the present invention will be explained hereunder.

Figure 1A:
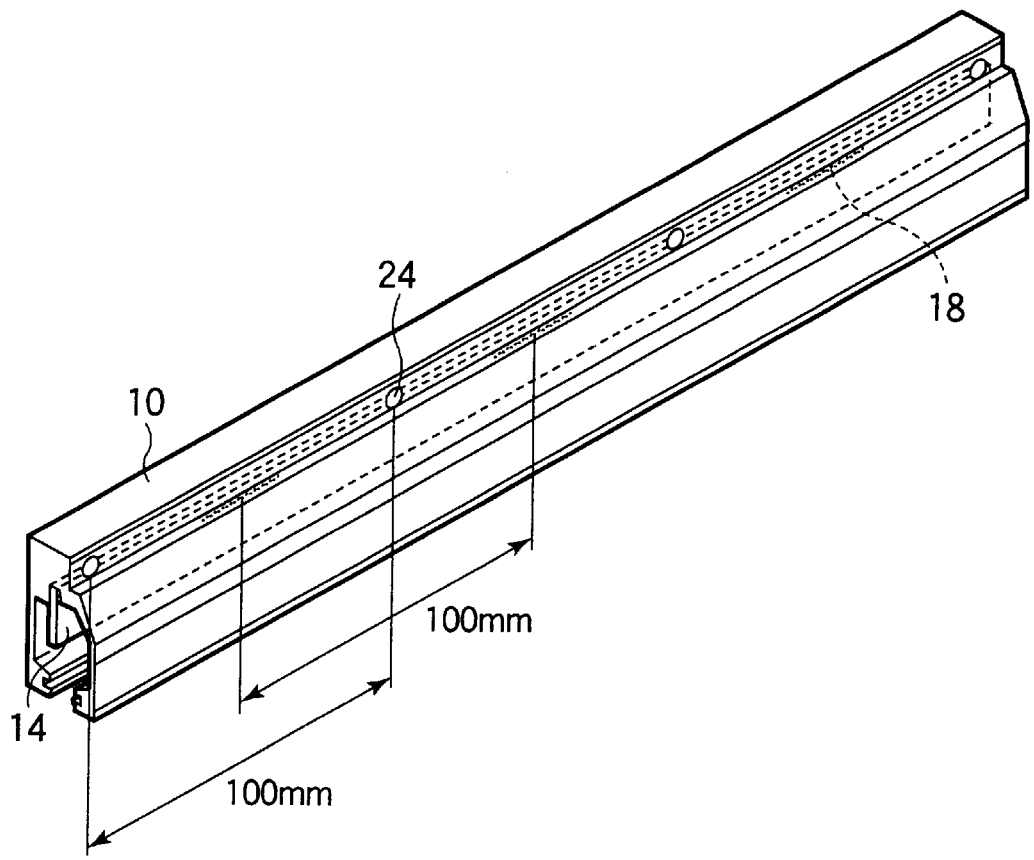
FIGS. 1A, 1B, and 1C show a perspective view and cross-sectional views, respectively, illustrating an aluminum frame provided on a unit type linear scale of an embodiment of the present invention.
Figure 1B:
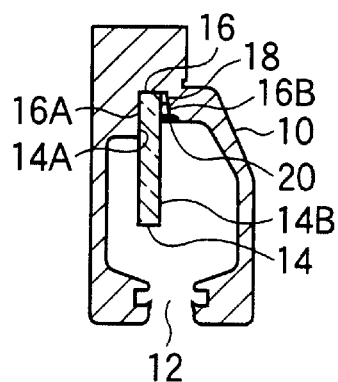
Figure 1C:
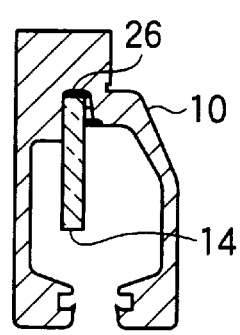
Figure 3A:
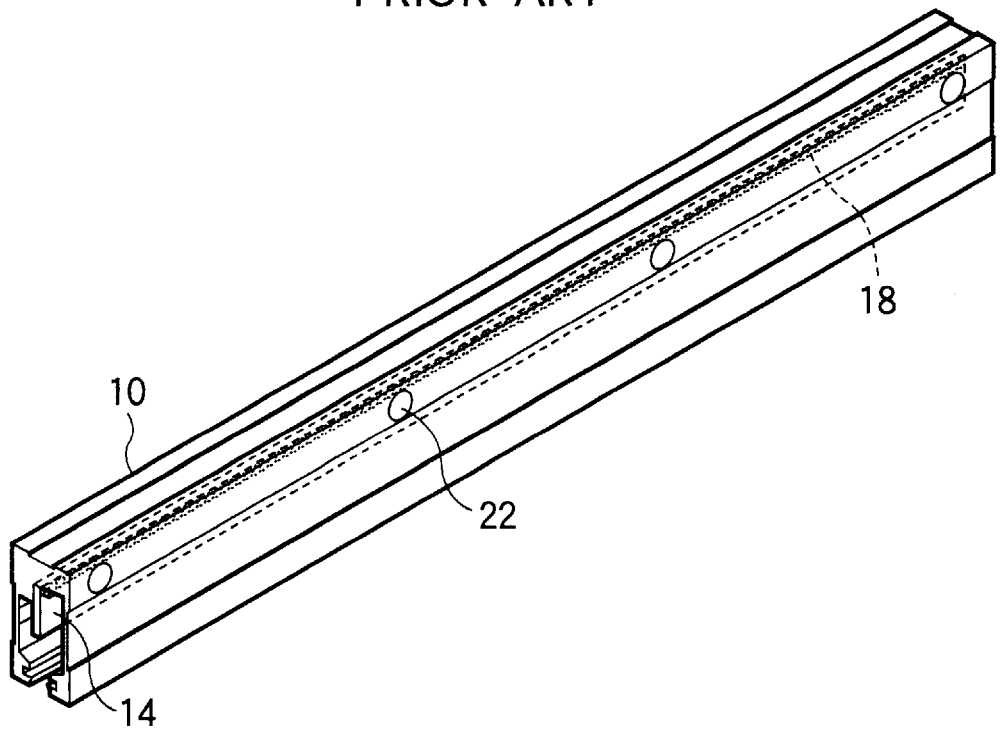
FIGS. 3A and 3B show a perspective view and a cross sectional view, respectively, illustrating an aluminum frame provided on a conventional unit type linear scale.

FIG. 1A, corresponding to the perspective view in FIG. 3A, is a perspective view of an aluminum frame provided by a unit type linear scale of a first embodiment according to the present invention. FIG. 1B is a transverse cross sectional view of the aluminum frame taken at a portion outside the center position thereof in the direction of length measurement, and FIG. 1C is a transverse cross sectional view taken at the center position thereof in the direction of length measurement.

Figure 3B:
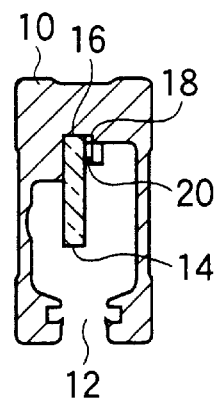

The shape of the internal circumference appearing in the cross section of the aluminum frame 10 (frame body) provided by the unit type linear scale is formed in a shape substantially equal to that shown in FIG. 3B with a difference in part in the shape of the external circumference appearing in the cross section.

The unit type linear scale of this embodiment is constituted in such a way that the aluminum frame 10 houses a plate-shaped main scale 14 extending in the direction of length measurement and the frame 10 is fixed to an object of measurement (not shown) with screws through screw holes 24. The screw holes 24 are arranged and formed at four positions with equal spacing in the direction of length measurement.

Also, in this unit type linear scale, a groove 16 is formed in the aluminum frame 10 and extended in the direction of length measurement. One wall surface 16A of the groove 16 is made to contact with one surface 14A of the main scale 14. Round cross section rubber pieces 18 (elastic members) are provided between the other wall surface 16B of the groove 16 and the other surface 14B of the main scale 14 in the direction of length measurement at places excluding those where the screw holes 24 are formed, and thereby the scale 14 is secured on the aluminum frame 10.

Examples of embodiments of the unit type linear scale described above will now be described. The screw holes 24 are formed in the aluminum frame 10 with an equal pitch of 100 mm, and the round cross section rubber pieces 18 are placed at the middle positions (center positions) between adjacent screw holes 24. Each of the round cross section rubber pieces 18 has a hardness of 50 and prepared with a length of 25 mm, and is inserted between the other wall surface 16B of the groove 16 and the other surface 14B of the main scale 14 with a squeeze of 0.5 mm. Thereby the main scale 14 can be arranged so as to be pressed against the other surface 16A of the groove 16, and the scale 14 can be secured on the aluminum frame 10 by the pressing force. Also, when fixing the aluminum frame 10 on an object of measurement with screws through the screw holes 24, a screw tightening torque of, for example, 300 N·cm may be applied.

Furthermore, in this embodiment, as shown in FIG. 1C, the main scale 14 is fixed to the aluminum frame 10 with a silicon adhesive 26 (securing means) at an end surface (one point) in the width direction of the main scale at the center position in the direction of length measurement, and is secured by pressing force (securing force) stronger than that by the round cross section rubber pieces 18.

Figure 2A:
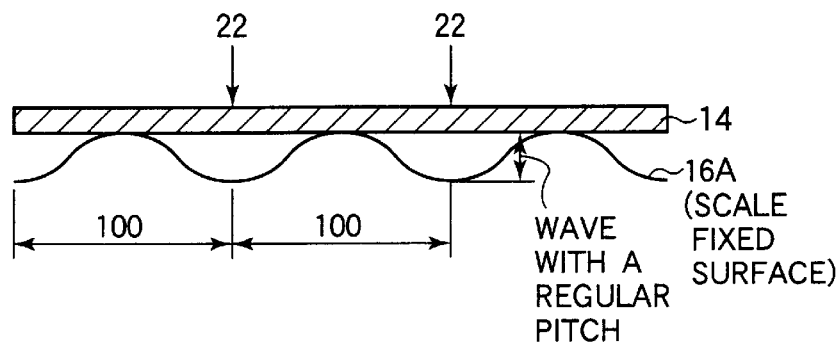
Figure 2A:
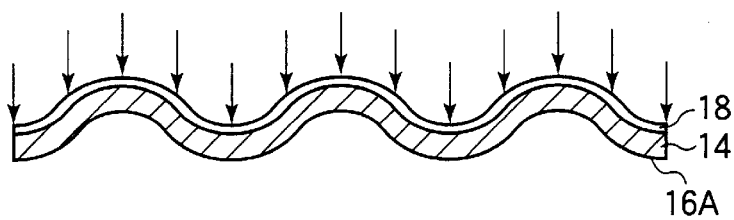
Figure 2A:
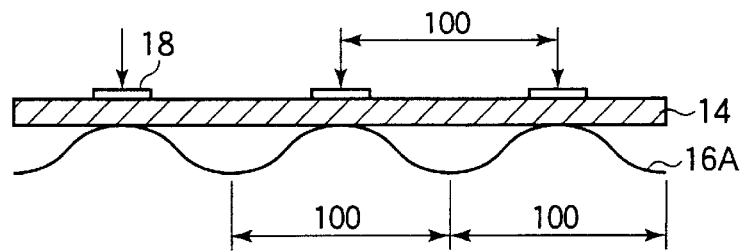

Functions and effect of this embodiment is explained now with FIGS. 2A–2C in which they are exaggeratedly indicated.

FIG. 2A shows the positions where fixing screws 22 are applied, and the aluminum frame 10 at the side of the round cross section rubber pieces 18 is not shown in the figure. As seen from the figure, the aluminum frame 10 is fixed with screws 22 to an object of measurement at multiple positions, and a wave is generated in the aluminum frame 10 by the tightening force applied by the screws. In the figure, the surface on which the main scale 14 is fixed, corresponds to the wall surface 16A of the groove 16 with which the main scale 14 is made to contact. When using fixing screws as described above, if the round cross section rubber piece 18 is used for the entire length of the main scale as shown in FIG. 3, the main scale 14 copies the shape of the wave of the aluminum frame as shown in FIG. 2B that indicates the relationship between the aluminum frame 10 at the opposite side of the same aluminum frame shown in FIG. 2A and main scale 14. Thereby measurement accuracy (linear accuracy) is decreased.

Contrary to this, in this embodiment, as FIG. 2C in which the positional relationship between the scale fixing surface, main scale 14, and round cross section rubber pieces 18 is shown, the height and period of the wave of the aluminum frame 10 can be maintained constant by arranging the screws 22 for fixing the aluminum frame 10 with an equal spacing of 100 mm. As a result, the wave of the aluminum frame 10 is not transmitted to the main scale 14 owing to the round cross section rubber pieces 18 disposed at the crests (middle positions between adjacent screws) of the wave, so that the decrease in measurement accuracy can be prevented.

Furthermore, by bonding one point (or one portion) of the main scale 14 at the center in the direction of length measurement to the aluminum frame 10, securing force for the main scale at this center position is greater than other portions (where round cross section rubber pieces 18 are located), so that the reference point (a point which does not move) of elongation of the main scale 14 caused by change in temperature can be set at this center position. Thus, positional shifting of the main scale 14 in the direction of length measurement can be prevented, and thermal characteristics of the unit type linear can be improved.

Also, bonding one point of the main scale 14 in the direction of length measurement to the aluminum frame 10 can reduce the possibility of such failure that the main scale 14 falls out of the aluminum frame 10 by the effect of external force, etc.

Furthermore, because the round cross section rubber pieces 18 for securing the main scale are partly applied, unevenness of friction force generated between the main scale 14 and the aluminum frame 10 is reduced, so that the behavior of elongation of the main scale 14 for change in temperature can be stabilized.

By using at the same time the both methods of (1) partly applying round cross section rubber pieces 18 except for the fixing position of the aluminum frame 10 and of (2) bond-fixing the main scale 14 at one point at the center thereof in the direction of length measurement, the transmission of the wave of the flame 10 to the main scale 14 is prevented, and also the behavior of elongation of the main scale 14 against change in temperature can be stabilized. Therefore, the combination of the two methods functions most effectively.

The present invention has been specifically described above; however, the invention is not limited to those described in the embodiments, and may be changed and modified without departing from the spirit of the invention.

For example, specific dimensions of the pitch of screws and those of the round cross section rubber pieces as well as specific materials of the round cross section rubber pieces, etc. are not limited to those described in the embodiments, and the position where the main scale 14 is bonded to the aluminum frame 10 can be at any position and not limited at the center position in the direction of length measurement. Also, instead of a round cross section rubber piece 18 for securing the main scale 14, other elastic members such as a metal plate spring and the like having functions equivalent to a round cross section rubber piece may be used.

What is claimed is:

1. A unit type linear scale having a frame body housing a plate-shaped main scale and extending in a direction of length measurement, the frame body being fixed at multiple positions with screws to an object of measurement through screw holes formed at a plurality of positions along the direction of length measurement, wherein:
 a groove is formed in said frame body and extended in the direction of length measurement, one surface of said main scale being made to contact with one wall surface of said groove; and
 a plurality of elastic members, each elastic member being provided between another surface of said main scale and another wall surface of said groove along the length measurement direction excluding portions where planes perpendicular to the length measurement direction intersect the respective screw holes, each elastic member being provided substantially at a center position between adjacent screws.

2. The unit type linear scale according to claim 1, wherein said main scale is secured at any one point along the direction of length measurement by securing means having a larger force than the securing force provided by said elastic material.

3. The unit type linear scale according to claim 1, wherein said screw holes are formed with an equal pitch along the direction of length measurement.

4. The unit type linear scale according to claim 2, wherein the any one point is substantially at a center part of the groove along the direction of length measurement.

5. A unit type linear scale, comprising:
 a frame body housing a plate-shaped main scale and extending in a direction of length measurement, the frame body having a plurality of screw holes formed therein at a plurality of positions along the direction of length measurement;
 a groove formed in said frame body and extending in the direction of length measurement, one surface of a main scale being made to contact with one wall surface of a groove; and
 at least one elastic member provided between another surface of the main scale and another wall surface of the groove along the length measurement direction excluding portions where planes perpendicular to the length measurement direction intersect the respective screw holes.

6. The unit type linear scale according to claim 5, wherein said main scale is secured at any one point along the direction of length measurement by securing means having a larger force than the securing force provided by said elastic material.

7. The unit type linear scale according to claim 6, wherein the any one point is substantially at a center part of the groove along the direction of length measurement.

8. The unit type linear scale according to claim 5, wherein said screw holes are formed with an equal pitch along the direction of length measurement.

* * * * *